(12) United States Patent
Kobayashi

(10) Patent No.: US 12,356,279 B2
(45) Date of Patent: Jul. 8, 2025

(54) INFORMATION PROCESSING APPARATUS AND INFORMATION PROCESSING METHOD

(71) Applicant: TOSHIBA TEC KABUSHIKI KAISHA, Tokyo (JP)

(72) Inventor: Tohru Kobayashi, Numazu Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 793 days.

(21) Appl. No.: 17/575,645

(22) Filed: Jan. 14, 2022

(65) Prior Publication Data

US 2022/0377495 A1 Nov. 24, 2022

(30) Foreign Application Priority Data

May 24, 2021 (JP) .................................. 2021-086721

(51) Int. Cl.
*H04W 4/02* (2018.01)
*H04W 4/029* (2018.01)
(Continued)

(52) U.S. Cl.
CPC ........... *H04W 4/023* (2013.01); *H04W 4/025* (2013.01); *H04W 4/029* (2018.02); *H04W 8/26* (2013.01); *H04W 12/06* (2013.01); *H04W 84/04* (2013.01)

(58) Field of Classification Search
CPC ..... H04W 4/023; H04W 4/029; H04W 4/025; H04W 8/26
(Continued)

(56) References Cited

U.S. PATENT DOCUMENTS 11,463,312 B2 * 10/2022 Maniyar ............. H04L 41/0806
2018/0331899 A1 * 11/2018 Gates .................... H04W 12/02
(Continued)

FOREIGN PATENT DOCUMENTS

| EP | 3041293 A1 | 7/2016 |
| JP | 2006-211168 A | 8/2006 |
| JP | 6679961 B | 4/2020 |

OTHER PUBLICATIONS

Extended European Search Report mailed Aug. 5, 2022, in corresponding European Patent Application No. 22158480.8, 13 pages.
(Continued)

*Primary Examiner* — William Nealon
(74) *Attorney, Agent, or Firm* — Kim & Stewart LLP

(57) ABSTRACT

An information processing apparatus for configuring a first device and a second device connectable thereto includes an interface and a memory that stores: location information indicating a predetermined location at which the devices are to be installed, first information indicating an initial setting for the first device, and second information indicating an initial setting for the second device. The apparatus further includes a processor configured to, upon receipt of a first request including location information from the first device, authenticate the first device by comparing a location indicated by the location information with the predetermined location, when the authentication is successful, control the interface to transmit the first information to the first device, and upon receipt of a second request from the first device after the initial setting for the first device has been set, control the interface to transmit the second information to the first device.

18 Claims, 5 Drawing Sheets

(51) Int. Cl.
  *H04W 8/26* (2009.01)
  *H04W 12/06* (2021.01)
  *H04W 84/04* (2009.01)

(58) Field of Classification Search
  USPC .................................................... 455/456.1
  See application file for complete search history.

(56) References Cited

U.S. PATENT DOCUMENTS

2020/0044917 A1  2/2020 Peng
2020/0128392 A1* 4/2020 Li ..................... H04W 8/245
2020/0274760 A1* 8/2020 Biedermann ....... H04L 41/0886
2022/0046415 A1* 2/2022 Chiang .............. H04L 63/0853

OTHER PUBLICATIONS

Calhoun P et al: "Control and Provisioning of Wireless Access Points (CAPWAP) Protocol Specification; rfc5415.txt", Control and Provisioning of Wireless Access Points (CAPWAP) Protocol Specification; RFC5415.TXT, Internet Engineering Task Force, IETF; Standard, Internet Society (ISOC) 4, Rue Des Falaises CH-1205 Geneva, Switzerland, Mar. 1, 2009 (Mar. 1, 2009), XP015065502, [retrieved on Mar. 4, 2009].
Notice of Reasons for Refusal mailed Oct. 29, 2024 in corresponding Japanese Patent Application No. 2021-086721, 6 pages (with Translation).

* cited by examiner

FIG. 3

| FIRST DEVICE ID | LOCATION INFORMATION | INITIAL SETTING INFORMATION | MAIN SETTING INFORMATION |
|---|---|---|---|
| 00001 | ... | ... | ... |
| 00002 | ... | ... | ... |
| 00003 | ... | ... | ... |
| ... | ... | ... | ... |

FIG. 4

| FIRST DEVICE ID | LOCATION INFORMATION | SECOND DEVICE ID | INITIAL SETTING INFORMATION | MAIN SETTING INFORMATION |
|---|---|---|---|---|
| 00001 | ⋮ | 00011 | ⋮ | ⋮ |
|  |  | 00012 | ⋮ | ⋮ |
|  |  | ⋮ | ⋮ | ⋮ |
| 00002 | ⋮ | ⋮ | ⋮ | ⋮ |
| 00003 | ⋮ | ⋮ | ⋮ | ⋮ |
| ⋮ | ⋮ | ⋮ | ⋮ | ⋮ |

INFORMATION PROCESSING APPARATUS AND INFORMATION PROCESSING METHOD

CROSS-REFERENCE TO RELATED APPLICATION

This application is based upon and claims the benefit of priority from Japanese Patent Application No. 2021-086721, filed May 24, 2021, the entire contents of which are incorporated herein by reference.

FIELD

Embodiments described herein relate generally to an information processing apparatus, an information processing method, and a non-transitory computer readable medium storing program instructions related to an information processing method for establishing communication connections.

BACKGROUND

Zero touch provisioning (ZTP) is a known method to automatically perform an initial setup for communication relay devices and the like. In the related art, with ZTP, a target device is connected to a network with an Ethernet® cable and obtains an IP address of the target device from a Dynamic Host Configuration Protocol (DHCP) server to download initial setting information (initialization information) from a server connected to the network.

However, in such a method, it is necessary to operate a DHCP server on the network to which the target device is connected. If another DHCP server already exists on the network to which the target device is connected, the DHCP processing may conflict in some cases.

In addition, in a method using DHCP, if the target device is a wireless device that does not have an Ethernet port and can only communicate using Wi-Fi®, in order to acquire an IP address by the DHCP protocol, Wi-Fi connection authentication information needs to be somehow acquired in advance.

A method of acquiring initial setting information from an initial setting server via a wireless interface is also known. However, in such a case, there is a possibility that the initial setting information will be acquired illegitimately by an unauthorized device.

BRIEF DESCRIPTION OF THE DRAWINGS

FIG. 3 depicts a data structure of a first table for storing initial setting information.

FIG. 4 depicts a data structure of a second table for storing initial setting information.

DETAILED DESCRIPTION

Figure 1:
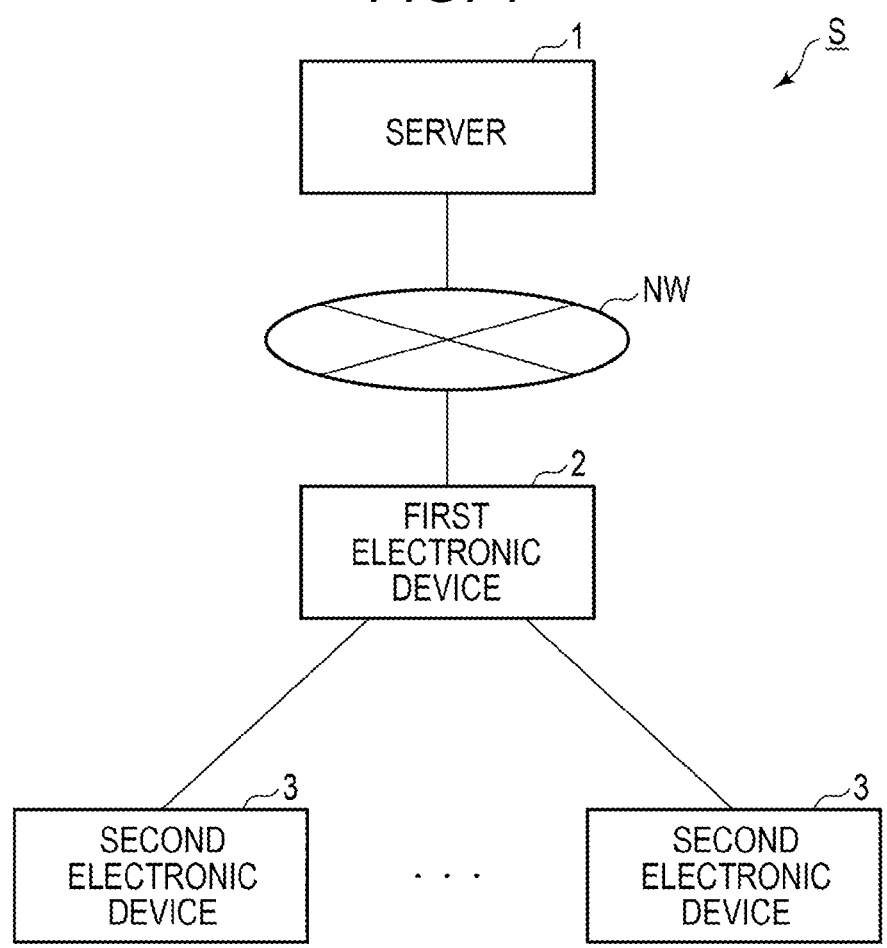
FIG. 1 is a block diagram illustrating an information processing system according to an embodiment.

One or more embodiments of the present disclosure provide a technique capable of preventing an unknown or unauthorized device from acquiring setting information.

In general, according to one embodiment, an information processing apparatus for configuring a first electronic device and a second electronic device connectable to the first electronic device, includes a network interface and a memory that stores: location information indicating a predetermined location at which the first and second electronic devices are to be installed, first setting information indicating an initial setting for the first electronic device, and second setting information indicating an initial setting for the second electronic device. The information processing apparatus further includes a processor configured to: upon receipt of a first request including location information from the first electronic device, authenticate the first electronic device by comparing a location indicated by the received location information with the predetermined location, when the authentication is successful, control the network interface to transmit the first setting information to the first electronic device, and upon receipt of a second request from the first electronic device after the initial setting for the first electronic device has been set, control the network interface to transmit the second setting information to the first electronic device.

Hereinafter, certain example embodiments will be described with reference to the drawings. In each drawing, the same components are denoted by the same reference numerals, and duplicate descriptions of repeated aspects will generally be omitted.

FIG. 1 is a block diagram illustrating an information processing system S according to an embodiment. The information processing system S includes a server 1, a first electronic device 2, and a plurality of second electronic devices 3. The server 1, the first electronic device 2, and the plurality of second electronic devices 3 are communicatively connected to each other via a network NW. For example, the network comprises at least one or more of the Internet, a cellular wireless network, a local area network (LAN), a dedicated line network, a closed network, a virtual private network (VPN), or the like. The information processing system S may also include two or more servers 1, two or more first electronic devices 2, and any number of second electronic devices 3.

The server 1 is an electronic device having an information processing function such as a computer. The server 1 has a function related to initial setting and a function related to main setting. The initial setting is, for example, a setting for communication between the server and another electronic device. The initial setting includes, for example, a setting related to an IP address. The main setting is, for example, a setting for an operating environment in which an electronic device is in a full operation. The main setting includes, for example, after establishing communication between the server 1 and another electronic device, outputting various setting information from the server 1 to the electronic device. In some cases, a portion of the initial setting (hereinafter referred to as "the first initial setting") may be performed first, and the remaining portion of the initial setting (hereinafter referred to as "the second initial setting") may be performed as the main setting. The server 1 is an example of the information processing apparatus. A configuration example of the server 1 will be described later.

The first electronic device 2 is an electronic device that can communicate with the server 1 and the second electronic device 3. For example, the first electronic device 2 is a management device installed in a commercial facility such as a supermarket. The first electronic device 2 includes a LAN interface such as Ethernet® and a wide area wireless communication interface such as a cellular wireless network. The first electronic device 2 performs the initial setting based on communication with the server 1 via, for example, the wide area wireless communication interface. The first electronic device 2 performs the main setting based on communication with the server 1 via, for example, the LAN interface. The first electronic device 2 acquires information necessary for the initial setting of the second electronic device 3 from the server 1. The first electronic device 2 includes or is connected to a positioning device such as a global positioning system (GPS) module. The first electronic device 2 acquires location information of the first electronic device 2 from the positioning device.

The second electronic device 3 is an electronic device capable of communicating with the server 1 and the first electronic device 2. The second electronic device 3 is installed in a commercial facility such as a supermarket. The second electronic device 3 is, for example, a point-of-sales (POS) terminal, a graphic order terminal (GOT) ("GOT terminal"), a device hub, or the like. The second electronic device 3 includes a LAN interface such as Ethernet® and a specific low power wireless communication interface of 920 MHz band or the like. The second electronic device 3 performs the initial setting based on communication with the first electronic device 2 via, for example, the specific low power wireless communication interface. The second electronic device 3 performs the main setting based on communication with the server 1 via, for example, the LAN interface. The second electronic device 3 may also referred to as a related device.

A configuration example of the server 1 will be described.

Figure 2:
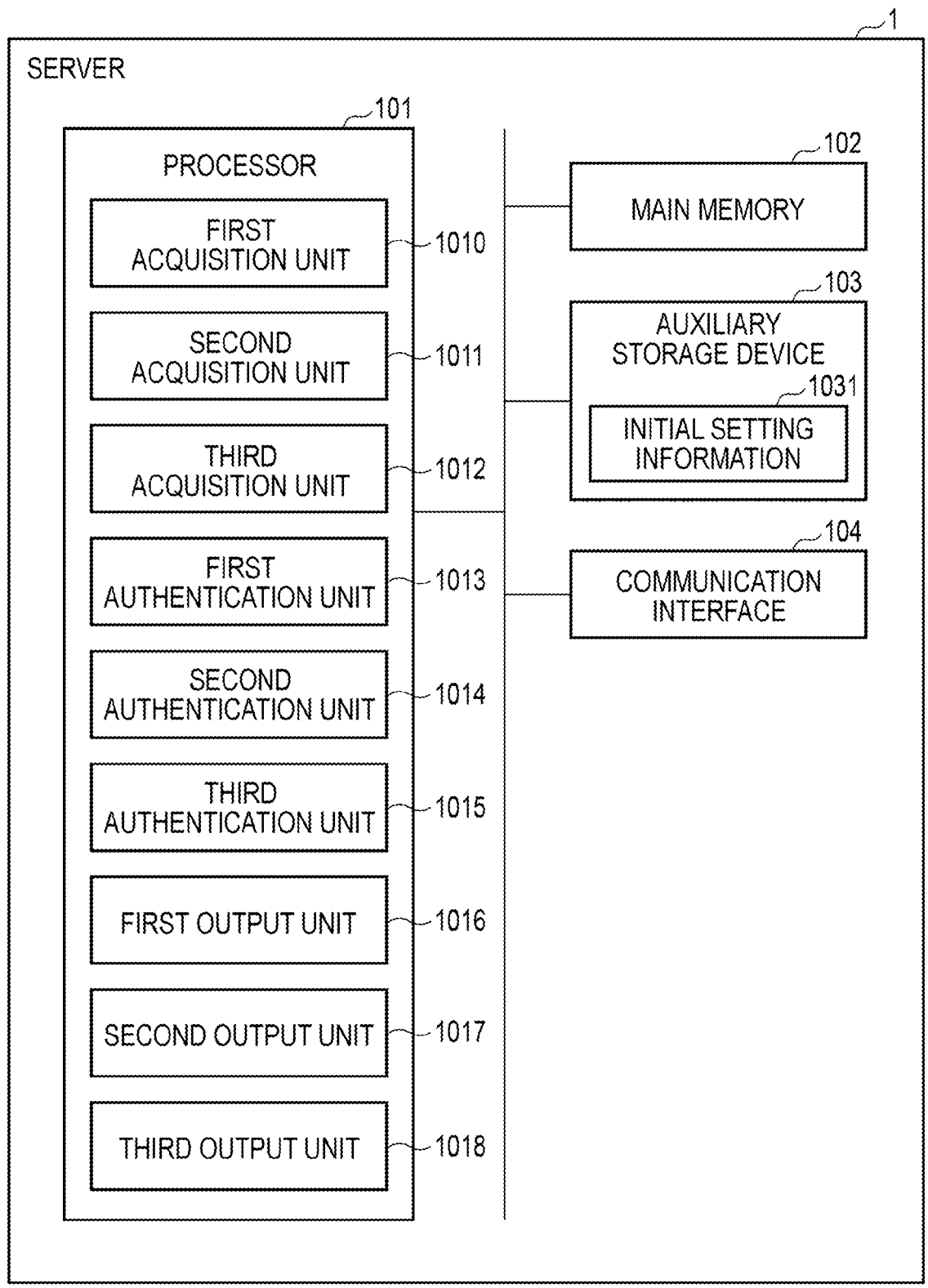
FIG. 2 is a hardware block diagram of a server according to an embodiment.

FIG. 2 is a hardware block diagram of the server 1 according to an embodiment.

The server 1 includes a processor 101, a main memory 102, an auxiliary storage device 103, and a communication interface (I/F) 104. The components of the server 1 are connected to each other so that signals can be input and output.

The processor 101 is, for example, a central processing unit (CPU), but is not limited thereto. The processor 101 may be implemented by various circuits. The processor 101 loads one or more programs stored in the auxiliary storage device 103 onto the main memory 102. The programs are executed by the processor 101 of the server 1 to achieve the functions described later. The processor 101 executes various operations by executing the programs loaded onto the main memory 102.

The main memory 102 includes a non-volatile storage area and a volatile storage area. The non-volatile storage area of the main memory 102 stores an operating system or the programs described above. The volatile storage area is used as a work area where data is appropriately rewritten by the processor 101. For example, the main memory 102 includes a read only memory (ROM) as the non-volatile storage area. For example, the main memory 102 includes a random access memory (RAM) as the volatile storage area.

The auxiliary storage device 103 is an electric erasable programmable read-only memory (EEPROM; registered trademark), a hard disk drive (HDD), a solid state drive (SSD), or the like. The auxiliary storage device 103 stores the above-mentioned programs, data used by the processor 101 to perform various processes, and data generated by the processes performed by the processor 101. The auxiliary storage device 103 is an example of a storage unit.

The auxiliary storage device 103 stores initial setting information 1031.

The initial setting information 1031 includes a first table and a second table. The first table includes one or more records, each including a first device ID, location information, initial setting information, and the main setting information. The first device ID is identification information of each first electronic device 2 assigned thereto. The location information is information indicating a location where the first electronic device 2 is installed. The location information includes, for example, the latitude and longitude indicating the location of the commercial facility where the first electronic device 2 is installed. The initial setting information is information related to the initial setting of the first electronic device 2. The main setting information is information related to the main setting of the first electronic device 2.

The second table includes one or more records, each including a first device ID, location information, a second device ID, initial setting information, and main setting information. The second device ID is identification information of each second electronic device 3 assigned thereto. The initial setting information is information related to the initial setting of the second electronic device 3 associated with one of the first electronic devices 2. The main setting information is information related to the main setting of the second electronic device 3 associated with one of the first electronic devices 2. A second device ID is associated with a first device ID appropriately by the user.

The data structures of the first table and the second table will be described later.

The communication interface 104 includes various interfaces that connect the server 1 to other electronic devices in a communicable manner via a network according to a particular communication protocol.

The hardware configuration of the server 1 is not limited to the above-described configuration. In general, the above-mentioned components of server 1 can be omitted or altered, and additional components can be appropriately incorporated into server 1.

Each function performed by the above-mentioned processor 101 will be described. The processor 101 performs the functions of: a first acquisition unit 1010, a second acquisition unit 1011, a third acquisition unit 1012, a first authentication unit 1013, a second authentication unit 1014, a third authentication unit 1015, and a first output unit 1016, a second output unit 1017, and a third output unit 1018. Each function may be executed by a controller including the processor 101 and the main memory 102.

The first acquisition unit 1010 acquires various information. For example, the first acquisition unit 1010 acquires, from a first electronic device 2, a request for the initial setting information thereof via the communication interface 104. The request for the initial setting information includes the location information of the first electronic device 2.

The second acquisition unit 1011 acquires various information. For example, the second acquisition unit 1011 acquires a request for the main setting information of the first electronic device 2 from the first electronic device 2 via the communication interface 104. The request for the main setting information includes the location information of the first electronic device 2.

The third acquisition unit 1012 acquires various information. For example, the third acquisition unit 1012 acquires, from a first electronic device 2, a request for the initial setting information of a second electronic device 3 via the communication interface 104. The request for the initial setting information of the second electronic device 3 includes the location information of the first electronic device 2.

The first authentication unit 1013 performs authentication based on the request for the initial setting information of the first electronic device 2 acquired by the first acquisition unit 1010. The first authentication unit 1013 performs authentication based on the location information of the first electronic device 2 acquired by the first acquisition unit 1010.

The second authentication unit 1014 performs authentication based on the request for the main setting information of the first electronic device 2 acquired by the second acquisition unit 1011. The second authentication unit 1014 performs authentication based on the location information of the first electronic device 2 acquired by the second acquisition unit 1011.

The third authentication unit 1015 performs authentication based on the request for the initial setting information of the second electronic device 3 acquired by the third acquisition unit 1012. The third authentication unit 1015 performs authentication based on the location information of the first electronic device 2 acquired by the third acquisition unit 1012.

The first output unit 1016 controls the communication interface 104 to output various information. The first output unit 1016 controls the communication interface 104 to output the initial setting information of the first electronic device 2 based on the authentication result by the first authentication unit 1013 to the first electronic device 2.

The second output unit 1017 controls the communication interface 104 to output various information. The second output unit 1017 controls the communication interface 104 to output the main setting information of the first electronic device 2 based on the authentication result by the second authentication unit 1014 to the first electronic device 2.

The third output unit 1018 controls the communication interface 104 to output various information. The third output unit 1018 controls the communication interface 104 to output the initial setting information of the second electronic device 3 based on the authentication result by the third authentication unit 1015 to the first electronic device 2.

FIG. 3 depicts a data structure of the first table included in the initial setting information 1031 according to an embodiment.

The first table includes a "first device ID" column, a "location information" column, an "initial setting information" column, and a "main setting information" column. The "first device ID" column is used for setting the first device ID of each first electronic device 2. The "location information" column is used for setting the location information of the location where each first electronic device 2 is installed. The "initial setting information" column is used for setting the initial setting information of each first electronic device 2. The initial setting information of each first electronic device 2 includes an IP address of the first electronic device 2, a subnet mask, an IP address of the default gateway, an IP address of the server 1, connection authentication information, and the like. For example, the "main setting information" column is used for setting the main setting information of each first electronic device 2. The main setting information of each first electronic device 2 includes various setting files necessary for the main setting of the first electronic device 2. Each of the plurality of first devices ID is associated with the location information, the initial setting information, and the main setting information by the first table. The information included in the first table can be set as appropriate. The server 1 updates the first table as appropriate.

FIG. 4 depicts a data structure of the second table included in the initial setting information 1031 according to an embodiment.

The second table includes a "first device ID" column, a "location information" column, a "second device ID" column, an "initial setting information" column, and a "main setting information" column. The "first device ID" column is used for setting the first device ID of each first electronic devices 2. The "location information" column is used for setting the location information of the location where each first electronic device 2 is installed. The "second device ID" column is used for setting the second device ID of each second electronic device 3. The "initial setting information" is used for setting the initial setting information of each second electronic device 3. The initial setting information of each second electronic device 3 includes an IP address of the second electronic device 3, the subnet mask, the IP address of the default gateway, the IP address of the server 1, the IP address of the first electronic device 2, the connection authentication information, and the like. For example, the "main setting information" column is used for setting the main setting information of each second electronic device 3. The main setting information of each second electronic device 3 includes various setting files necessary for the main setting of the second electronic device 3. Each of the plurality of first devices ID may be associated with the location information, a second device ID, the initial setting information of the second device, and the main setting information of the second device by the second table. Each of the plurality of first devices ID may be associated with one or more second devices ID. The second device ID associated with each of the plurality of first devices ID specifies, for example, the second electronic device 3 installed in the same commercial facility as the first electronic device 2 having the first device ID. The location information may instead, or in addition, indicate the location where a second electronic device 3 is installed. The information included in the second table can be set as appropriate. The server 1 updates the second table as appropriate.

The processing performed by the information processing system S will be described.

The following explanation mainly describes aspects of the server 1, in general, such aspects may more particularly be ascribed to the processor 101 of the server 1. The details of processing described below are only examples and may be varied as appropriate. In addition, with respect to the particular processing described below, steps can be omitted, replaced, and added as appropriate while still being within the scope of the present disclosure.

It is assumed in the present description that the first electronic device 2 has the first device ID "00001" and is installed in the same commercial facility as the second electronic devices 3 having the second device IDs "00011" and "00012". It is also assumed here that the second electronic device 3 having the second device ID "00011" is a POS terminal, and the second electronic device 3 having the second device ID "00012" is a GOT terminal. The number and types of the second electronic devices 3 are not limited to the above examples. The first electronic device 2 acquires the location information via a positioning device. It is assumed that the first electronic device 2 uses a GPS module as the positioning device. In such a case, the first electronic device 2 may be installed or moved to a location where GPS signals can be received.

Figure 5:
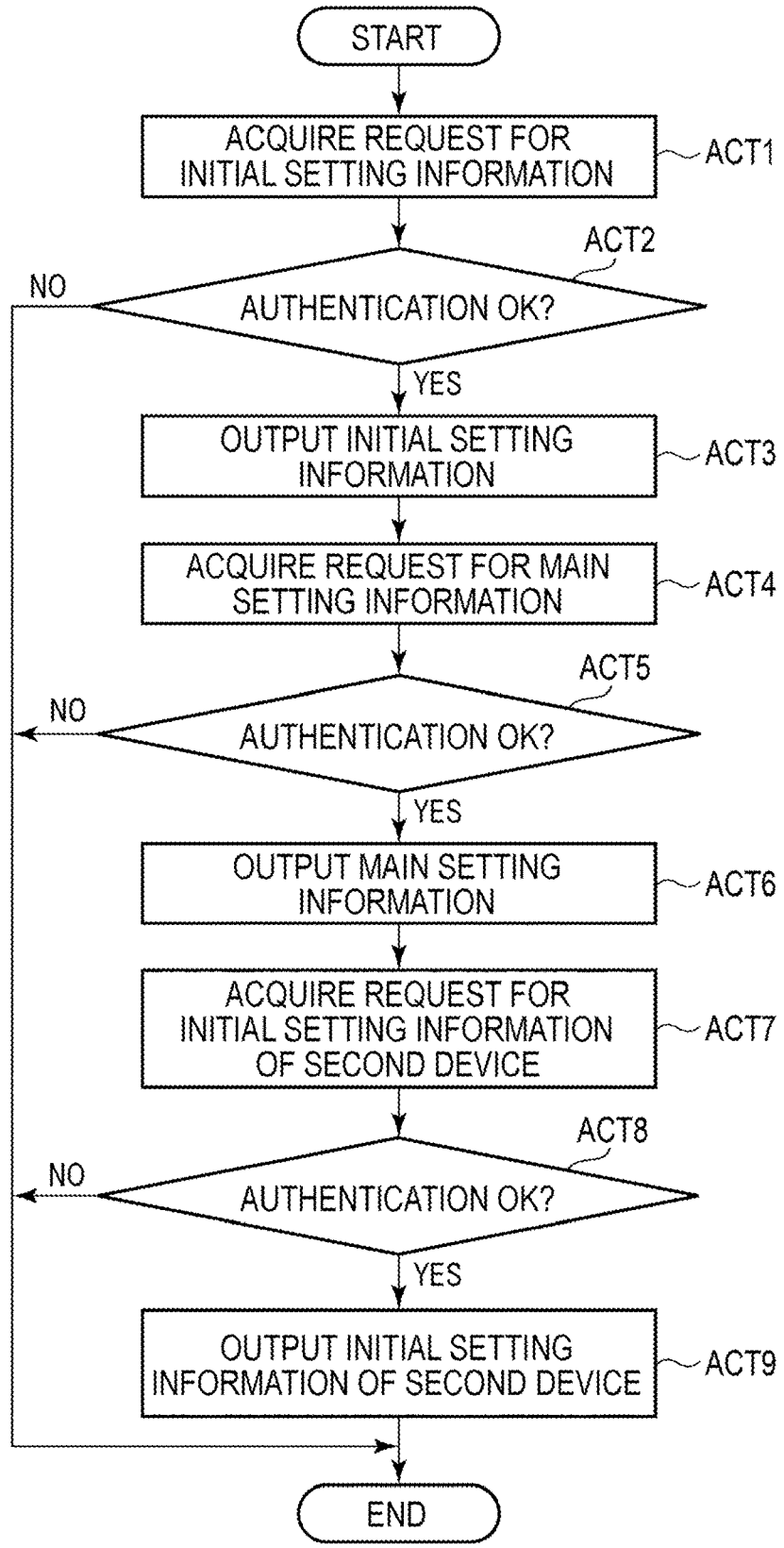
FIG. 5 is a flowchart of information processing performed by a server according to an embodiment.

FIG. 5 is a flowchart of information processing by the server 1 according to an embodiment.

The first acquisition unit 1010 acquires a request for the initial setting information related to the first electronic device 2 from the first electronic device 2 via the communication interface 104 (ACT1). The request for the initial setting information of the first electronic device 2 includes the location information of the first electronic device 2. The location information of the first electronic device 2 is, for example, the latitude and longitude indicating the location of the commercial facility where the first electronic device 2 is installed. The first acquisition unit 1010 may acquire the request for the initial setting information of the first electronic device from the first electronic device 2 via the cellular wireless network.

The first authentication unit 1013 performs authentication based on the request for the initial setting information of the first electronic device 2 acquired by the first acquisition unit 1010 (ACT2). In ACT2, for example, the first authentication unit 1013 performs authentication based on the location information of the first electronic device 2 acquired by the first acquisition unit 1010. The first authentication unit 1013 compares the location information of the first electronic device 2 acquired by the first acquisition unit 1010 with the location information stored in the first table by referring to the first table of the initial setting information 1031. The first authentication unit 1013 performs authentication for connection permission or connection non-permission based on whether the location information of the first electronic device 2 satisfies a predetermined criterion. The predetermined criterion is, for example, whether the location of the first electronic device 2 is within a predetermined range from the location stored in the first table. The predetermined range may be set based on, for example, a distance from the location of the commercial facility. The predetermined range may be set in advance, or may be appropriately updated by an administrator of the server 1 or the first electronic device 2. If the location information of the first electronic device 2 satisfies the predetermined criterion, the first authentication unit 1013 determines that the authentication succeeds (that is, connection is permitted). If the location information of the first electronic device 2 does not satisfy the predetermined criterion, the first authentication unit 1013 determines that the authentication fails (e.g., connection is not permitted).

If the first authentication unit 1013 determines that the authentication succeeds (YES in ACT2), the process transitions from ACT2 to ACT3. If the first authentication unit 1013 determines that the authentication fails (NO in ACT2), the process ends.

The first output unit 1016 controls the communication interface 104 to output the initial setting information of the first electronic device 2 to the first electronic device (ACT3). The initial setting information of the first electronic device 2 may be output to the first electronic device 2 via the cellular wireless network.

In some examples, the first electronic device 2 can perform the initial setting based on the initial setting information output by the first output unit 1016.

According to this example, the first authentication unit 1013 can perform authentication based on the request for the initial setting information including the location information of the first electronic device 2 acquired by the first acquisition unit 1010. Accordingly, the first authentication unit 1013 can confirm that a request is received from a legitimate first electronic device 2 by comparing the preset installation location of the first electronic device 2 with the location indicated by the location information received from the first electronic device 2.

In addition, the first output unit 1016 can control the communication interface 104 to output the initial setting information of the first electronic device 2 based on the authentication result by the first authentication unit 1013 to the first electronic device 2. For this reason, the server 1 can output the initial setting information only to the legitimate first electronic device 2 and, thus, can prevent unknown electronic devices from acquiring the setting information.

The second acquisition unit 1011 acquires the request for the main setting information related to the first electronic device 2 from the first electronic device 2 via the communication interface 104 (ACT4). The request for the main setting information of the first electronic device 2 includes the location information of the first electronic device 2. The second acquisition unit 1011 may acquire the request for the main setting information of the first electronic device 2 from the first electronic device 2 via any network, e.g., a cellular wireless network.

The second authentication unit 1014 performs authentication based on the request for the main setting information of the first electronic device 2 acquired by the second acquisition unit 1011 (ACT5). In ACT5, for example, the second authentication unit 1014 performs authentication based on the location information of the first electronic device 2 acquired by the second acquisition unit 1011. Similarly to ACT2, the second authentication unit 1014 performs authentication indicating connection permission or connection non-permission based on whether the location information of the first electronic device 2 acquired by the second acquisition unit 1011 satisfies the predetermined criterion by referring to the first table of the initial setting information 1031. If the location information of the first electronic device 2 satisfies the predetermined criterion, the second authentication unit 1014 determines that the authentication succeeds (that is, connection is permitted). If the location information of the first electronic device 2 does not satisfy the predetermined criterion, the second authentication unit 1014 determines that the authentication fails (that is, connection is non-permitted).

If the second authentication unit 1014 determines that the authentication succeeds (YES in ACT5), the process transitions from ACT5 to ACT6. If the first authentication unit 1013 determines that the authentication fails (NO in ACT5), the process ends.

The second output unit 1017 controls the communication interface 104 to output the main setting information of the first electronic device 2 to the first electronic device 2 (ACT6). The main setting information of the first electronic device 2 may be output to the first electronic device 2 via any network, e.g., a cellular wireless network.

In some examples, the first electronic device 2 can perform the main setting based on the main setting information output by the second output unit 1017.

According to this example, the second authentication unit 1014 can perform authentication based on a request for main setting information including the location information of the first electronic device 2 acquired by the second acquisition unit 1011. Accordingly, the second authentication unit 1014 can confirm that a request is received from a legitimate first electronic device 2 by comparing the preset installation location of the first electronic device 2 with the location information output from the first electronic device 2.

In addition, the second output unit 1017 can control the communication interface 104 to output to the first electronic device 2 the main setting information of the first electronic device 2 based on the authentication result by the second authentication unit 1014. Accordingly, the server 1 can output the main setting information only to the legitimate first electronic device 2 and, thus, can prevent unknown electronic devices from acquiring the setting information.

The third acquisition unit 1012 acquires a request for the initial setting information of the second electronic device 3 from the first electronic device 2 via the communication interface 104 (ACT7). The request for the initial setting information of the second electronic device 3 includes the location information of the first electronic device 2. The third acquisition unit 1012 may acquire the request for the initial setting information of the second electronic device 3 from the first electronic device 2 via any network, e.g., a cellular wireless network.

The third authentication unit 1015 performs authentication based on the request for the initial setting information of the second electronic device 3 acquired by the third acquisition unit 1012 (ACT8). In ACT8, for example, the third authentication unit 1015 performs authentication based on the location information of the first electronic device 2 acquired by the third acquisition unit 1012. The third authentication unit 1015 compares the location information of the first electronic device 2 acquired by the third acquisition unit 1012 with the location information stored in the second table by referring to the second table of the initial setting information 1031. The third authentication unit 1015 performs authentication for connection permission or connection non-permission based on whether the location information of the first electronic device 2 satisfies the predetermined criterion. The predetermined criterion is, for example, whether the location of the first electronic device 2 is within a predetermined range from the location stored in the second table. The predetermined range may be set based on, for example, a distance from the location of the commercial facility. The predetermined range may be set in advance, or may be appropriately updated by an administrator of the server 1 or the first electronic device 2. The predetermined range may be the same range as or different from the predetermined range in ACT2. If the location information of the first electronic device 2 satisfies the predetermined criterion, the third authentication unit 1015 determines that the authentication succeeds (that is, connection is permitted). If the location information of the first electronic device 2 does not satisfy the predetermined criterion, the third authentication unit 1015 determines that the authentication fails (that is, connection is not permitted).

If the third authentication unit 1015 determines that the authentication succeeds (YES in ACT8), the process transitions from ACT8 to ACT9. If the third authentication unit 1015 determines that the authentication fails (NO in ACT8), the process ends.

The third output unit 1018 controls the communication interface 104 to output the initial setting information of the second electronic device 3 to the first electronic device 2 (ACT9). The initial setting information of the second electronic device 3 may be output to the first electronic device 2 via any network, e.g., a cellular wireless network.

According to this example, the third authentication unit 1015 can perform authentication based on the request for the initial setting information of the related device (e.g., the second electronic device 3) of the first electronic device 2 including the location information of the first electronic device 2 and acquired by the third acquisition unit 1012. Accordingly, the third authentication unit 1015 can confirm that the request is received from a legitimate first electronic device 2 by comparing the preset installation location of the first electronic device 2 with the location indicated by the location information received from the first electronic device 2.

In addition, the third output unit 1018 can control the communication interface 104 to output to the first electronic device 2 the initial setting information of the related device of the first electronic device 2 based on the authentication result by the third authentication unit 1015. Accordingly, the server 1 can output the initial setting information of the related device only to the legitimate first electronic device 2 and, thus, can prevent unknown electronic devices from acquiring the setting information.

Further, since the first electronic device 2 and the related devices thereof (e.g., the second electronic devices 3) are installed in the same commercial facility, the legitimacy of the related devices can also be confirmed by the server 1 based on the location information of the first electronic device 2. Accordingly, the server 1 can output the legitimate initial setting information of the related device to the first electronic device 2.

The first electronic device 2 can function as a server for local initial setting of the second electronic device 3 after acquiring the initial setting information of the second electronic device 3 that is output by the third output unit 1018. For example, the second electronic device 3 can acquire the initial setting information from the first electronic device 2 via a specific low power wireless communication interface. The second electronic device 3 can perform the initial setting based on the initial setting information acquired from the first electronic device 2. The second electronic device 3 can acquire its main setting information from the server 1 via, for example, the LAN interface. The second electronic device 3 may perform the main setting based on the main setting information acquired from the server 1.

In the above example, the server 1 performs the steps shown in FIG. 5, but a system including multiple devices may perform the steps such that each device performs one or more of the above-described functions. For example, one of the devices (e.g., a first server) performs the functions related to the initial setting, and another of the devices (e.g., a second server) performs the functions related to the main setting.

The information processing performed by the server 1 as described above may be executed also when replacing a first electronic device 2.

The programs may be transferred already stored in the server 1 or may be transferred in another manner. In the latter case, the programs may be transferred via a network or may be transferred via a recording medium. The recording medium is a non-transitory computer readable recording medium. The recording medium may be any form as long as it can store programs. For example, the recording medium may be a CD-ROM or a memory card.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus for configuring a first electronic device and a second electronic device connectable to the first electronic device, the information processing apparatus comprising:
a network interface;
a memory that stores:
location information indicating a predetermined location at which the first and second electronic devices are to be installed,
first setting information indicating an initial setting that is required for the first electronic device to connect to the information processing apparatus via a first network, and
second setting information indicating an initial setting for the second electronic device; and
a processor configured to:
upon receipt of a first request including location information from the first electronic device via a second network that is different from the first network, authenticate the first electronic device by comparing a location indicated by the received location information with the predetermined location,
when the authentication is successful, control the network interface to transmit the first setting information to the first electronic device via the second network, and
upon receipt of a second request from the first electronic device via the first network after the initial setting for the first electronic device has been set, control the network interface to transmit the second setting information to the first electronic device.

2. The information processing apparatus according to claim 1, wherein the processor is further configured to determine that the authentication is successful when the location indicated by the received location information is within a predetermined range from the predetermined location.

3. The information processing apparatus according to claim 1, wherein
the second request includes location information,
the processor is further configured to, after the second request is received, authenticate the first electronic device by comparing a location indicated by the location information of the second request with the predetermined location, and
the second setting information is transmitted to the first electronic device when the authentication is successful.

4. The information processing apparatus according to claim 1, wherein
the memory further stores third setting information indicating a main setting for the first electronic device, and
the processor is further configured to, upon receipt of a third request from the first electronic device after the initial setting for the first electronic device has been set, control the network interface to transmit the third setting information to the first electronic device.

5. The information processing apparatus according to claim 4, wherein
the memory further stores fourth setting information indicating a main setting for the second electronic device, and
the processor is further configured to, upon receipt of a fourth request from the first electronic device after the second setting information has been transmitted, control the network interface to transmit the fourth setting information to the first electronic device.

6. The information processing apparatus according to claim 1, wherein the second network is a wide area network (WAN).

7. The information processing apparatus according to claim 6, wherein the initial setting for the first electronic device includes a network address to be used by the first electronic device.

8. A method performed by an information processing apparatus for configuring a first electronic device and a second electronic device connectable to the first electronic device, the method comprising:
storing, in a memory:
location information indicating a predetermined location at which the first and second electronic devices are to be installed,
first setting information indicating an initial setting that is required for the first electronic device to connect to the information processing apparatus via a first network, and
second setting information indicating an initial setting for the second electronic device;
upon receipt of a first request including location information from the first electronic device via a second network that is different from the first network, authenticating the first electronic device by comparing a location indicated by the received location information with the predetermined location;
when the authentication is successful, transmitting the first setting information to the first electronic device via the second network; and
upon receipt of a second request from the first electronic device via the first network after the initial setting for the first electronic device has been set, transmitting the second setting information to the first electronic device.

9. The method according to claim 8, further comprising:
determining that the authentication is successful when the location indicated by the received location information is within a predetermined range from the predetermined location.

10. The method according to claim 8, wherein
the second request includes location information,
the method further comprises, after the second request is received, authenticating the first electronic device by comparing a location indicated by the location information of the second request with the predetermined location, and
the second setting information is transmitted to the first electronic device when the authentication is successful.

11. The method according to claim 8, further comprising:
storing, in the memory, third setting information indicating a main setting for the first electronic device; and
upon receipt of a third request from the first electronic device after the initial setting for the first electronic device has been set, transmitting the third setting information to the first electronic device.

12. The method according to claim 11, further comprising:
storing, in the memory, fourth setting information indicating a main setting for the second electronic device; and
upon receipt of a fourth request from the first electronic device after the second setting information has been transmitted, transmitting the fourth setting information to the first electronic device.

13. The method according to claim 8, wherein the second network is a wide area network (WAN).

14. The method according to claim 8, wherein the initial setting for the first electronic device includes a network address to be used by the first electronic device.

15. A non-transitory computer readable medium storing a program causing a computer to execute a method for configuring a first electronic device and a second electronic device connectable to the first electronic device, the method comprising storing, in a memory:

location information indicating a predetermined location at which the first and second electronic devices are to be installed, first setting information indicating an initial setting that is required for the first electronic device to connect to the computer via a first network, and second setting information indicating an initial setting for the second electronic device;

upon receipt of a first request including location information from the first electronic device via a second network that is different from the first network, authenticating the first electronic device by comparing a location indicated by the received location information with the predetermined location;

when the authentication is successful, transmitting the first setting information to the first electronic device via the second network; and upon receipt of a second request from the first electronic device via the first network after the initial setting for the first electronic device has been set, transmitting the second setting information to the first electronic device.

16. The computer readable medium according to claim 15, wherein the method further comprises determining that the authentication is successful when the location indicated by the received location information is within a predetermined range from the predetermined location.

17. The computer readable medium according to claim 15, wherein the second request includes location information, the method further comprises, upon receipt of the second request from the first electronic device, authenticating the first electronic device by comparing a location indicated by the location information of the second request with the predetermined location, and the second setting information is transmitted to the first electronic device when the authentication is successful.

18. The computer readable medium according to claim 15, wherein the method further comprises:

storing, in the memory, third setting information indicating a main setting for the first electronic device; and upon receipt of a third request from the first electronic device after the initial setting for the first electronic device has been set, transmitting the third setting information to the first electronic device.

\* \* \* \* \*